(12) United States Patent
Otten et al.

(10) Patent No.: US 6,274,232 B1
(45) Date of Patent: Aug. 14, 2001

(54) ABSORBENT SHEET MATERIAL HAVING CUT-RESISTANT LAYER AND METHOD FOR MAKING THE SAME

(75) Inventors: Geneva Gail Otten; Albert Sylvester Crawford, II, both of Cincinnati; Daniel James Rhoads, Columbus; John David Norcom, West Chester; Richard Tweddell, III; Peter Worthington Hamilton, both of Cincinnati; Richard Emil Hildebrand, IV, West Chester; Kenneth Stephen McGuire, Wyoming, all of OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/451,884

(22) Filed: Dec. 1, 1999

Related U.S. Application Data (63) Continuation-in-part of application No. 09/336,496, filed on Jun. 18, 1999, now abandoned.

(51) Int. Cl.⁷ .............................. B32B 3/26; A61F 13/15
(52) U.S. Cl. ................ 428/315.9; 428/47; 428/304.4; 428/315.5; 604/358
(58) Field of Search ................... 428/34.8, 35.4, 428/35.7, 36.1, 47, 304.4, 315.5, 315.9; 604/358

(56) References Cited

U.S. PATENT DOCUMENTS

| | | |
|---|---|---|
| 2,962,414 | 11/1960 | Araledter ............................ 162/145 |
| 2,962,415 | 11/1960 | Arledter ............................... 162/145 |
| 3,184,373 | 5/1965 | Arledter ............................... 162/152 |
| 3,325,345 | 6/1967 | Hider ................................... 162/169 |
| 3,517,407 * | 6/1970 | Wyant . |
| 3,678,933 * | 7/1972 | Moore et al. ........................ 128/296 |
| 3,856,610 * | 12/1974 | Bruneel ................................. 161/43 |
| 3,888,248 * | 6/1975 | Moore et al. ........................ 128/156 |
| 3,937,648 | 2/1976 | Huebner et al. ..................... 162/168 |
| 4,128,686 * | 12/1978 | Kyle et al. ........................... 428/219 |
| 4,225,383 | 9/1980 | McReynolds ....................... 162/156 |
| 4,275,811 * | 6/1981 | Miller .................................. 206/204 |
| 4,311,479 | 1/1982 | Fenn et al. .............................. 8/495 |
| 4,328,275 | 5/1982 | Vargo .................................. 428/156 |
| 4,379,808 | 4/1983 | Cole et al. .......................... 428/438 |
| 4,614,679 | 9/1986 | Farrington, Jr. et al. ........... 428/138 |
| 4,667,665 * | 5/1987 | Blanco et al. ...................... 128/156 |
| 4,769,109 | 9/1988 | Tellvik et al. ...................... 162/123 |
| 4,769,274 | 9/1988 | Tellvik et al. ...................... 428/218 |
| 4,865,855 | 9/1989 | Hansen et al. ...................... 426/124 |
| 4,878,765 | 11/1989 | Watkins et al. ..................... 383/116 |
| 4,957,805 | 9/1990 | Biggs et al. ........................ 428/223 |
| 5,093,164 | 3/1992 | Bauer et al. ........................ 428/35.4 |
| 5,215,627 | 6/1993 | Willis et al. ........................ 162/156 |
| 5,338,406 | 8/1994 | Smith ............................... 162/168.2 |
| 5,414,248 | 5/1995 | Phillips .............................. 219/730 |

(List continued on next page.)

* cited by examiner

Primary Examiner—Cathy Lam
(74) Attorney, Agent, or Firm—Peter D. Meyer (57) ABSTRACT

An absorbent and cut-resistant sheet having a cut-resistant material with a plurality of openings, and an absorbent material attached to the cut-resistant material. Preferably, the apertured cut-resistant material is in the form of sheet having a thickness of between about 0.005 inches and about 0.020 inches, and has an open area of less than about 50 percent. It is also preferred that the cut-resistant sheet have fold lines formed on a non-cutting surface, so as to make the material easily foldable and/or tearable. In addition, a stainable absorbent cover layer can be attached to a cutting surface of the cut-resistant sheet to provide an indication of where cutting has occurred, and to give the material a desirable appearance. A liquid impervious backing layer is also preferably attached to the absorbent material to resist the escape of fluid from the absorbent material. It is preferred that the cut-resistant sheet comprises a polymeric material.

10 Claims, 4 Drawing Sheets

U.S. PATENT DOCUMENTS

| | | | |
|---|---|---|---|
| 5,480,693 | 1/1996 | Patterson et al. | 428/36.7 |
| 5,501,886 | 3/1996 | Hammer et al. | 428/34.8 |
| 5,536,555 | 7/1996 | Zelazoski et al. | 428/138 |
| 5,580,423 | 12/1996 | Ampulski et al. | 162/111.7 |
| 5,607,745 | 3/1997 | Ogden | 428/138 |
| 5,613,427 | 3/1997 | Wiley | 99/446 |
| 5,662,758 | 9/1997 | Hamilton et al. | 156/221 |
| 5,709,897 | 1/1998 | Pearlstein | 426/106 |
| 5,714,229 | 2/1998 | Ogden | 428/138 |
| 5,718,955 | 2/1998 | McGuire et al. | 428/35.7 |
| 5,802,610 * | 9/1998 | Burr | 2/49.4 |
| 5,804,241 | 9/1998 | Isohata | 426/415 |
| 5,833,894 | 11/1998 | Lanzani et al. | 264/46.3 |
| 5,888,604 | 3/1999 | Evans, Jr. et al. | 428/47 |
| 5,925,406 | 7/1999 | McGuire et al. | 427/208.2 |
| 5,965,235 | 10/1999 | McGuire et al. | 428/156 |
| 6,037,022 | 3/2000 | Adur et al. | 428/34.3 |

ABSORBENT SHEET MATERIAL HAVING CUT-RESISTANT LAYER AND METHOD FOR MAKING THE SAME

RELATED APPLICATION

This application is a continuation-in-part of application Ser. No. 09/336,496, filed on Jun. 18, 1999, now abandoned; the entire disclosure of which is hereby incorporated herein by reference.

TECHNICAL FIELD

The present invention relates generally to cut-resistant, flexible, and absorbent sheet materials. More specifically, in one embodiment, the present invention relates to a sheet material having a flat polymer upper layer having drainage openings and fold lines, the upper sheet being bonded to a lower absorbent layer.

BACKGROUND OF THE INVENTION

Sheet materials having durability, such as those having cut-resistance and shred resistance properties, are desirable for a variety of applications. For instance, protective sheet materials can be used in protecting countertops during food preparation. The durability of the material prevents the cutting utensil from damaging the counter top when preparing food items.

For convenience of use, it is also desirable that such protective sheet materials be easily disposable. In this regard, it is desirable that the sheet material have absorbent properties such that juices from the food are well contained, thereby facilitating clean-up following the food preparation operations. In addition, the ability to visibly stain in the presence of colored food effluent is desired, such that a stain will occur after cutting, to indicate to the user that the sheet has already been used.

Moreover, it is desirable that the sheet material be easily folded or collapsed to facilitate placement and storage of the sheet material in a trash container following usage. In areas where trash space is limited, the ability to fold the sheet material and to keep it folded is even more important. Moreover, flexibility and conformability of the sheet material allows it to be more easily stored, dispensed, and manipulated during usage.

However, typical protective materials, such as polymer materials for example, are not very absorbent, and in fact are often hydrophobic. Accordingly, such materials typically do not absorb fluids well, nor provide a stain indication of where cutting has occurred. Moreover, such materials, when provided in adequate thickness to provide cut resistance and protect surfaces, are typically resilient in nature and so do not easily fold. Thus, they are typically not readily foldable for ease of placement in a trash container.

Additionally, obtaining the correct sheet size suited for the task is desirable. The sheet is preferably large enough for big tasks and yet also readily dividable into smaller sheets for smaller tasks, thereby reducing product waste.

Accordingly, it is desirable to provide a unitary sheet material with multiple diverse properties, such as cut and abrasion resistance, shred resistance, use indication, absorbency, flexibility, and/or ability to be divided into the desired sheet size. It is also desirable to provide a sheet material which includes a substantially smooth cutting surface, such that food items can be easily cut on the material without interference from grooves or other structures. It is further desirable to provide such a material which may be readily and economically manufactured.

SUMMARY OF THE INVENTION

It is an object of the present invention to obviate the above-described problems.

Another object of the present invention is to provide a disposable and protective cutting sheet with a substantially smooth cutting surface.

It is a further object of the present invention to provide a sheet material that is both absorbent and cut-resistant.

Yet another object of the present invention is to provide a sheet material that can be used to slice food items while resisting wear from the cutting tool and absorbing juices from the food item.

A further object of the present invention is to provide a sheet material that is resistant to shredding and can absorb significant amounts of liquid produced by food items.

Another object of the present invention is to provide a cut-resistant and absorbent sheet material that is readily disposable.

Yet another object of the present invention is to provide a cut-resistant and absorbent, sheet material that is easily foldable.

Another object of the present invention is to provide a cut resistant and absorbent sheet material that can be divided into smaller sections.

A further object of the present invention is to provide a cut-resistant and absorbent sheet material that does not have a plastic-like appearance.

It is another object of the present invention to provide a protective and absorbent sheet material that can provide an indication of whether it has already been used.

To achieve the foregoing and other objectives, a cut-resistant and absorbent sheet, is provided. The sheet comprises an absorbent material and a cut-resistant material attached to the absorbent material. The cut-resistant material has a plurality of openings, and has an open area of less than about 50 percent.

According to another aspect of the invention, a sheet material is provided which comprises an absorbent material and a cut resistant material attached to the absorbent material. The sheet material exhibits a slice resistance of at least about 30 kgf/cm. In addition, the sheet material will stain after contact with liquid.

Still other objects of the present invention will become apparent to those skilled in this art from the following description wherein there is shown and described preferred embodiments of this invention, including a best mode currently contemplated for carrying out the invention, simply for the purposes of illustration. As will be realized, the invention is capable of other different aspects and embodiments without departing from the scope of the invention. Accordingly, the drawings and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description of preferred embodiments, taken in conjunction with the accompanying drawings in which:

DETAILED DESCRIPTION OF PREFERRED EMBODIMENTS

Figure 1:
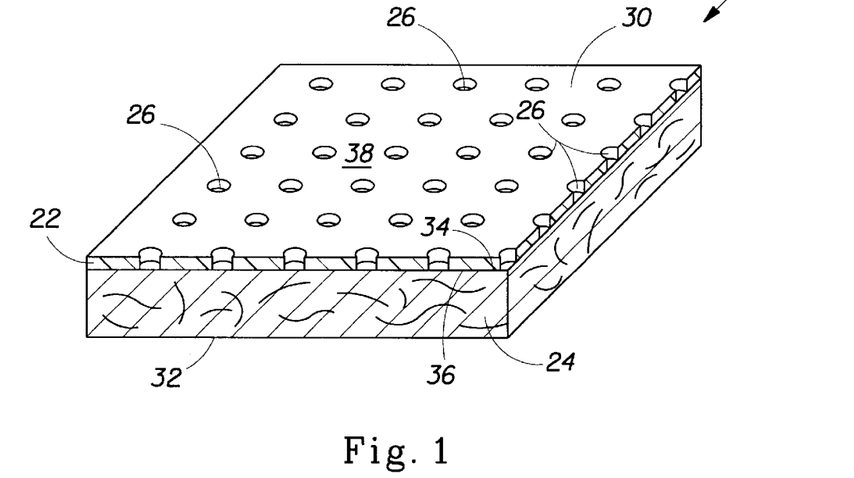
FIG. 1 is a segmented perspective view of an exemplary absorbent and protective sheet of material, made according to principles of the present invention.

Turning now to the drawings in detail, wherein like numerals indicate corresponding structure throughout the views, FIG. 1 is a partially-segmented perspective view of an exemplary absorbent and protective sheet of material 20, made according to principles of the present invention. In this embodiment, the material 20 comprises two layers, an upper cut-resistant layer 22 which covers a lower absorbent layer 24 and is attached thereto. The two layers 22 and 24 can be attached in any suitable manner, such as by bonding or laminating the cut-resistant layer 22 to the absorbent layer 24, or by casting or extruding the cut-resistant layer 22 to the absorbent layer 24. The lower surface 36 of the cut-resistant layer 22 is adjacent the upper surface 34 of the absorbent layer 24. In this embodiment, the sheet 20 includes a cutting surface 30, which is defined by the cut-resistant layer 22, and a base surface 32, which is defined by the absorbent layer 24. Preferably, the surfaces 30 and 32 are substantially planar, and the thickness of the sheet between these two surfaces is between about 0.010 inches and about 0.060 inches. By making the cutting surface 30 substantially planar, food items may be easily cut on this surface without interference from grooves or other structures.

The absorbent layer 24 can be formed from a suitable absorbent material for absorbing and/or containing the fluids of interest. Suitable materials include fibrous webs or sheets of material formed from fibers of natural (e.g., cellulosic) and/or synthetic origin, including hollow fibers and capillary channel fibers. Other suitable materials which can be included in the absorbent layer 24 include absorbent polymeric foams, absorbent polymeric gelling materials, hydrogels, natural starches and gums. Materials of particular interest include cellulosic substrates such as paperboard. The absorbent layer 24 may comprise one integral layer of material or may comprise a laminate structure having multiple layers of the same or diverse composition. Moreover, the absorbent layer 24 may comprise a carrier web that itself may or may not be absorbent, but which may carry an absorbent material. Preferably, the absorbent layer 24 has two surfaces 32 and 34 which are substantially planar, the thickness between the two surfaces preferably being between about 0.005 inches and about 0.050 inches, preferably between about 0.010 inches and about 0.015 inches.

The cut-resistant layer 22 may be formed from any durable material or materials which are substantially resistant to cutting, abrasions, and shredding from cutting utensils used for food preparation, such as kitchen knives for instance. Typical materials which are known in the art as exhibiting such properties may be utilized, including those which typically exhibit a high degree of toughness and an interlocked molecular structure of comparatively high molecular weight. In addition, the cut-resistant layer 22 is preferably formed from a material or materials which can be bonded, laminated, cast, extruded, coated, sprayed, adhered, or otherwise applied to the absorbent layer 24. Suitable materials include a polymeric layer bonded, adhered, or laminated to the absorbent layer 24, thermoplastic or thermoset resins directly case or extruded onto the absorbent layer. Exemplary materials to be used for the cut-resistant layer 22 include polymeric materials, such as ethylene vinyl acetate (EVA), high density polyethylene (HDPE), styrene including polystyrene, low density polyethylene (LDPE), linear low density polyethylene (LLDPE), polyvinyl chloride (PVC), plastisols, crystallized polyethylene teraphthalate (CPET), polyethylene teraphthalate (PET), polyethylene teraphthalate glycol modified (PETG), polypropylene (PP), and polyurethanes, as well as polymeric composite materials and copolymers. A selection of material for the layer 22 can be made based upon the cut-resistance and hydrophilicity desired. Those materials which are more hydrophilic, such as CPET for example, are of particular interest in forming the layer 22. Other substances and additives may be provided within the cut-resistant layer 22 to enhance and/or add various properties and/or to reduce the cost of the layer. For example, anti-bacterial agents, deodorizing agents, coagulating agents, and/or low-cost fillers could be utilized. Moreover, although the cut-resistant layer 22 is shown in FIG. 1 as an integral layer, it should be understood that the layer could comprise a laminate structure having multiple layers of similar or differing materials.

Preferably, the cut-resistant layer 22 comprises a flat polymer sheet having substantially planar surfaces 30 and 36, the preferred thickness of the polymer between the surfaces being between about 0.005 inches and about 0.020 inches, and most preferably about 0.010 inches. If desired, a design, pattern, or texture can be embossed, pressed, or otherwise applied to the surface 30 of the layer 22, to provide a desired finish and appearance. For example, it may be desirable to apply a matte surface to the layer 22, such as by embossing for example, to provide a matte appearance or non-glossy surface.

As shown in the embodiment of FIG. 1, a plurality of drainage openings 26 are formed in the cut-resistant layer 22. Any suitable process for forming the openings 26 in the layer 22 may be utilized. For example, the openings 26 may be drilled, punched, pressed, perforated, or molded into the layer 22. Each opening 26 extends from the cutting surface 30 to the lower surface 36 of the layer 22, and allows liquids that may be present at the cutting surface 30 to travel through the cut-resistant layer 22 and be absorbed by the absorbent layer 24. The location, shape, number, and size of the openings 26 can be varied as desired to obtain adequate drainage, absorbency, and cut-resistant. As an example, round openings of about 1/16 of an inch in diameter can be utilized, at a density of about 36 openings per square inch. Preferably, the openings 26 are spaced between about 0.1 inches to about 0.5 inches apart, and most preferably about 0.1875 inches apart. A density of between about 10 and about 200 openings per square inch is preferred. It is also preferred that the openings 26 are approximately evenly spaced. Moreover, it is preferred that the openings have a maximum dimension (e.g. diameter) of from about 0.010 inches to about 0.100 inches. The perforation pattern may be varied if desired, with the density of openings being greater in areas where absorbency is most desired (e.g., around the periphery of the sheet), and lesser elsewhere.

Also, it is preferred that the total surface area of the openings 26 on the surface 30 is less than the total surface area of the solid region 38 between the openings 26 (e.g., the cut-resistant layer 22 has an open area of less than about 50 percent). This configuration is preferred because, when the openings 26 become so large as to take up significant amounts of the surface area of the surface 30, the protection provided by the layer 22 begins to diminish, and the chances increase that the openings 26 will interfere with cutting operations.

Accordingly, the exemplary sheet material 20 of FIG. 1 can be used as an effective protective material. The base surface 32 can be placed on a supporting surface, such as a counter top, and food items can be placed on the cutting surface 30, where they may be cut, sliced, or otherwise processed. Because the openings 26 provide fluid communication between the cutting surface 30 and the absorbent layer 24, juices from the food items may drain through the openings 26 and into the absorbent layer 24 where they are absorbed and contained. Once the food items have been prepared, the sheet 20 may be discarded.

Figure 2:
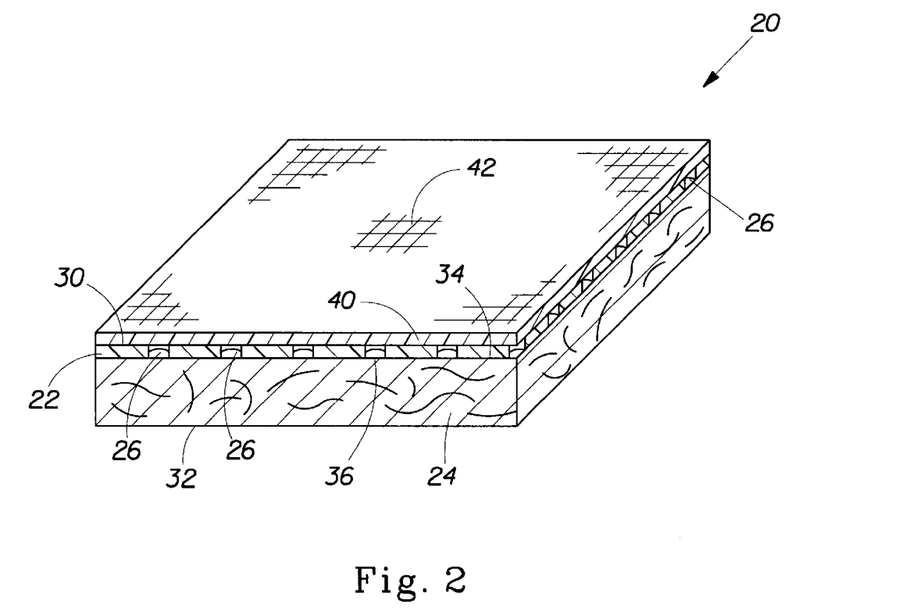
FIG. 2 is a segmented perspective view of another exemplary absorbent and protective sheet, made according to principles of the present invention.
Figure 5:
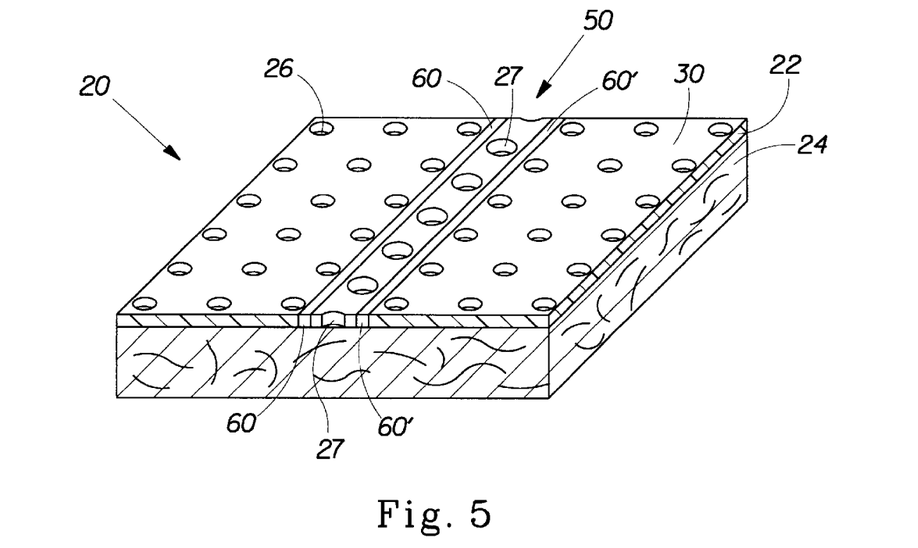
FIG. 5 is a segmented perspective view of an additional exemplary absorbent and protective sheet having tear lines and seal lines formed therein, in accordance with principles of the present invention.
Figure 6:
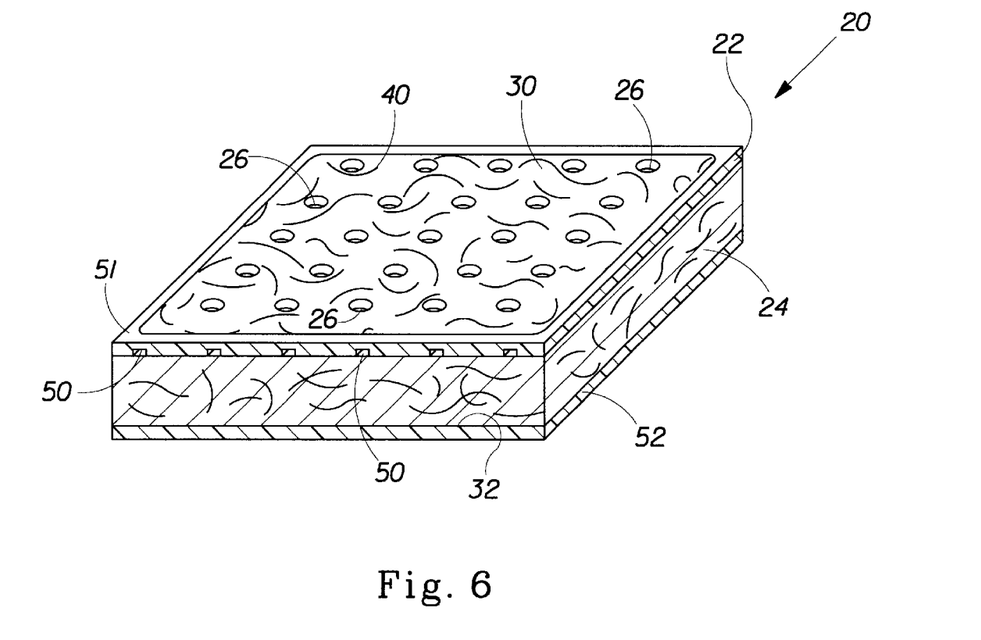
FIG. 6 is a segmented perspective view of another embodiment of an absorbent and protective sheet of material, made in accordance with principles of the present invention.

As shown in FIGS. 2, 5, and 6, in addition to a cut-resistant layer 22 and absorbent layer 24, other layers and materials may be provided to form the sheet material 20. For example, in the embodiment of FIG. 2, a cover layer 40 is provided over the top surface 30 of the cut-resistant layer 22. Accordingly, in the embodiment of FIG. 2, the top surface 42 of the cover layer is provided as the cutting surface. The cover layer 40 can comprise any material capable of being bonded, adhered, laminated, or otherwise applied to the surface 30 of the cut-resistant layer 22. For example, the cover layer 40 can be laminated or melt bonded to the cut-resistant layer 22. Preferably, the cover layer 40 and/or the absorbent layer 24 each comprise a material which can absorb and be stained by liquid. Accordingly, the cover layer 40 and/or the absorbent layer 24 can stain and indicate that cutting has occurred on the sheet 20, providing an indication to the user not to re-use the sheet, as it may be contaminated. It is also preferred that the cover layer 40 and/or the absorbent layer 24 is of a color such that stains provide such a use indication. The stains in the absorbent layer 24 can be viewed through the apertures 26 in the cut-resistant layer 22. Also, the cut-resistant layer 22 can be somewhat translucent or transparent so that stains in the absorbent layer 24 can be viewed from the exterior of the sheet 20.

Suitable materials to construct the cover layer 40 include non-woven materials, fabrics, paper materials, and/or fibrous materials. Preferably, the chosen material is laminated to the cut-resistant layer 22 to minimize shredding of the cover layer. (Shredding of the materials of the sheet 20 is not desirable, as it may introduce foreign materials into the food item being processed on the sheet). Fibers of natural (e.g., cellulosic) and/or synthetic origin can be utilized for the cover layer 40. For instance, a spunbonded fabric could be utilized, such as REEMAY® 2250 or REEMAY® 2004, manufactured by Reemay, Inc. In addition to providing a use indicator, the cover layer 40 can provide a paper-like appearance to the sheet 20 and mask any plastic-like appearance of the cut-resistant layer 22. Moreover, the cover layer 40 provides slip-resistance, so it can prevent food items from sliding off the sheet 20 when being cut on the surface 42 of the cover. In addition, the cover layer 40 can include additive agents, such as surfactants, anti-bacterial agents, etc.

Other features and properties can also be added to the protective sheet. For example, in the embodiment of FIG. 3, the cut-resistant layer 22 is made more flexible by forming fold lines 50 on one or more surfaces of the layer 22. In this figure, the cut-resistant layer 22 is shown partially pulled away from the absorbent layer 24 in order to reveal the fold lines 50 which have been formed on the lower surface 36 of the layer 22. In this embodiment, the fold lines 50 comprise a plurality of uni-directional grooves formed in the lower 36 surface. Any suitable method for forming the lines 50 can be utilized, such as by pressing, perforating, scoring, embossing, molding, etching, folding, slicing, etc. In addition, the lines 50 could be provided by removing material from the layer 22, or by providing flexible material at the desired locations in the layer 22. Also, the fold lines 50 can be provided in a variety of sizes, shapes, or locations on the cut-resistant sheet 20, as desired. However, it is preferred that the fold lines 50 are provided on the surface 36 which is opposite the cutting surface 30, to prevent the cutting edge from falling into the lines during cutting, thereby creating the risk that the food item will be mis-cut. It is also preferred that the cutting surface 30 remains substantially planar, so as not to interfere with cutting operations. The fold lines 50 could comprise tear lines or score lines which weaken the material 22 so as to make it less resistant to folding and/or tearing along the lines.

Figure 3:
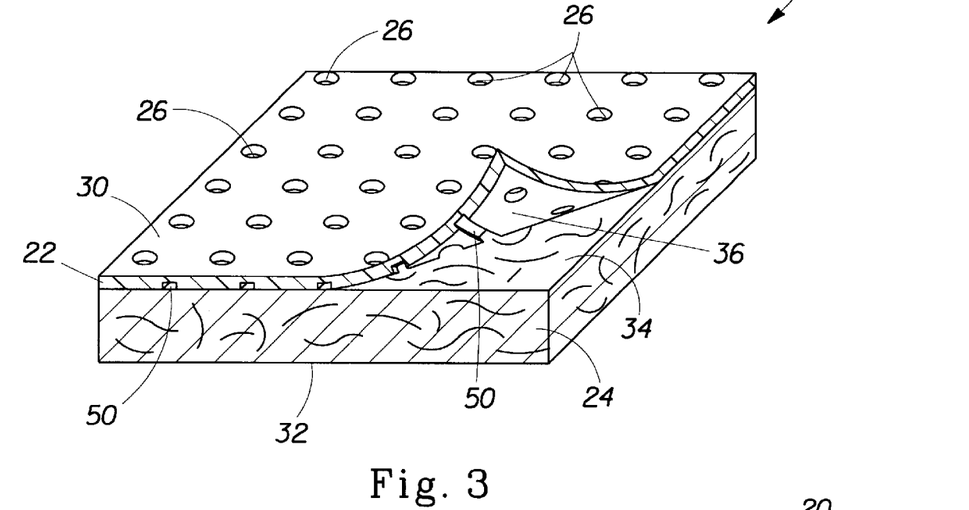
FIG. 3 is a segmented perspective view of yet another embodiment of an absorbent and protective sheet, made in accordance with principles of the present invention.

The fold lines 50 provided allow the sheet 20 to more easily flex and fold for additional ease in handling. In particular, the fold lines 50 allow the sheet 20 to be more easily folded for disposal within a trash container, and to keep the sheet substantially folded after being placed in such a container. Accordingly, by folding the sheet 20 along the fold lines 50, the sheet 20 will be less cumbersome to discard and will take up less space in the trash container.

Figure 4:
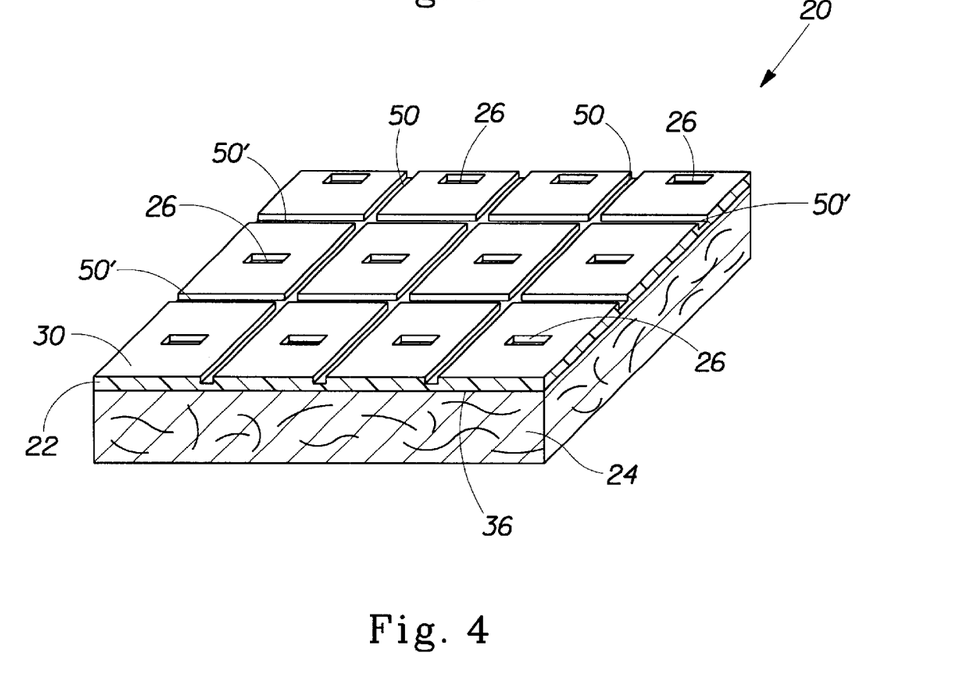
FIG. 4 is a segmented perspective view of another exemplary absorbent and protective sheet, made according to principles of the present invention.

Other configurations for the openings 26 and fold lines 50 can also be utilized. For example, in the embodiment of FIG. 4, the openings 26 are formed as slits in cut-resistant layer 22 to thereby provide fluid communication between the cutting surface 30 and the lower surface 36. Moreover, in this embodiment, intersecting fold lines 50 and 50' are provided on the cut-resistant layer 22, and these lines are provided on the surface 30.

Other configurations for the fold lines 50 can be utilized which provide additional functions as shown in FIG. 5. In this embodiment, the fold lines 50 are formed by removing entire portions of the cut-resistant layer 22 so as to form holes or perforations 27 therein. The line of holes 50 extends to the outer edges of the layer 22 and thus can be used to tear the sheet into 2 or more smaller sheets. To prevent liquids which have penetrated into the absorbent layer 24 from flowing out at the tear line 50, the entire sheet 20 can be sealed on each side of the tear line 50, such as by sealing along lines 60 and 60' of FIG. 5. Any appropriate sealing mechanism can be used to form the seal lines 60 and 60', such as a hot bar sealer for example. Although FIG. 5 illustrates a tear line 50 to divide the sheet 20 into two smaller sheets, additional lines 50 can be formed to separate the sheet into three, four, or any desired number of smaller sheets.

As noted earlier, additional layers of material may be utilized to form the sheet material 20, in addition to the cut-resistant layer and the absorbent layer. For instance, in the exemplary embodiment of FIG. 6, a backing layer 52 is provided on the lower surface 32 of the absorbent layer 24. The backing layer 52 is preferably liquid impervious to restrain fluid from leaving the absorbent layer 24 and contacting a support surface, such as a countertop. The backing layer 52 may be formed from any material or materials suitable for providing a layer, film, or coating for the sheet 20. Suitable materials include polymeric films, thermoplastic resins, or metallic foils. Materials such as vinyl acetate, EVA, metallocenes, polyethylene, and polyurethane could be utilized, for instance. The layer 52 can be bonded or laminated to the absorbent layer 24, extruded or thermoformed onto the absorbent layer 24, or printed, sprayed or otherwise applied to the absorbent layer. Moreover, while it is preferred that the backing layer 52 comprise one integral layer of material, a laminate structure having multiple layers of the same or differing composition could be utilized. For example, a polymer film, such as polypropylene for instance, can be coated with a skid-resistant substance, such as a high friction polymer for instance, to form the backing layer 52. Also, the backing layer 52 can include additive agents, such as surfactants, anti-bacterial agents, fillers, coatings, etc.

The backing layer 52 also preferably has a high coefficient of friction so as to provide skid resistance to the sheet material 20. To provide skid resistance, the backing layer 52 preferably has a coefficient of friction of at least about 0.3. While it is preferred that the backing layer 52 be fluid impervious and/or skid-resistant, the backing layer need not be cut-resistant. Accordingly, the backing layer 52 can be thinner and more flexible than the cut-resistant layer 22.

As shown in FIG. 6, additional absorbent capacity and protection of underlying surfaces maybe provided be providing a raised lip or border 51 around the periphery of the cutting surface 30 of the sheet material. The lip 51 also facilitates grasping of the sheet 20. Any suitable method of forming the lip 51 can be utilized, such as embossing, crimping, or pressing for example. Also shown in this embodiment is a fibrous material 40 which has been laminated or otherwise bonded to the cutting surface 30 of the cut-resistant layer 22. Such fibers can provide a matte or non-glossy appearance to the cutting surface 30.

Figure 7:
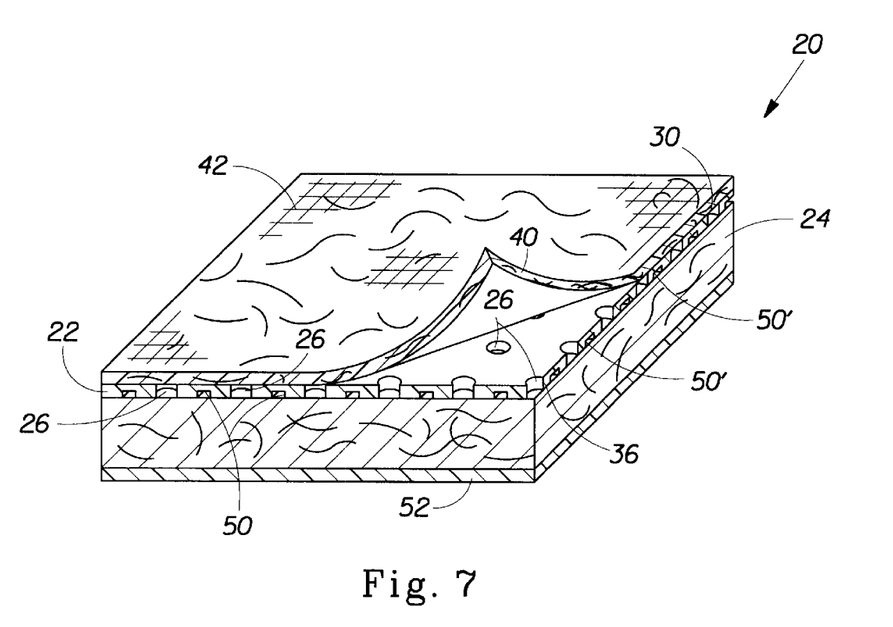
FIG. 7 is a segmented perspective view of yet another exemplary absorbent and protective sheet, made according to principles of the present invention.

In the exemplary embodiment of FIG. 7, the sheet material comprises four discrete layers. From top to bottom, the layers include a cover layer 40, a cut-resistant layer 22, an absorbent layer 24, and a backing layer 52. The layers may be bonded, sealed, laminated, adhered, attached, or formed together by any suitable methods, such as those described above for example. Suitable materials for these four layers have also been described above with respect to the other embodiments. As noted above, the cover layer 40 is preferably a non-woven, fibrous or paper-like absorbent material to provide a non-plastic look to the sheet and to provide an indicator of where cutting has occurred. The cut-resistant layer 22 preferably comprises a polymer or polymer composite and includes drainage openings 26 to allow fluid communication between the cover layer 40 and the absorbent layer 24. Moreover, the cut-resistant layer 22 preferably includes transverse fold lines 50', and longitudinal fold lines 50 on its lower surface 36 to provide flexibility, and ease of folding and disposal. As noted above, these lines are preferably formed on the surface opposite the cutting surface 30, so as not to interfere with cutting operations. The absorbent layer 24 is provided to draw in and contain fluids, and the backing layer 52 is liquid impervious to prevent fluids from escaping from the sheet 20. Preferably, the backing layer 52 is also skid-resistant.

EXAMPLE 1

A sheet material such as that of FIG. 7 is formed by the following exemplary method. A piece of REEMAY 2250 nonwoven PET fabric is placed on top of a flat sheet of CPET. These two pieces are then placed on top of a piece of silicon rubber, the CPET sheet being adjacent the rubber. The silicone rubber ensures even distribution of pressure during pressing. Next, a steel plate with a fine grit texture is placed on top of the nonwoven fabric. The entire laminate is then pressed at 325 F. for 20 seconds at 150 psi. When the laminate is removed, the fabric and the CPET will have fused leaving a unitary sheet. The side of the unitary sheet in contact with the silicon rubber will be smooth. The side in contact with the steel plate will have a fibrous texture and appearance and a dull finish.

After the unitary sheet is formed, holes are created using a punch and die mechanism. This method fully removes material from the sheet while introducing very little stress to the sheet, enabling the sheet to remain substantially flat after the operation.

Next, fold lines are created. There are a variety of methods to incorporate fold lines such as creasing, perforating, or otherwise selectively weakening desired areas of the sheet. In one exemplary method, a steel rule perforating die is used to form a perforated line in the sheet.

Next, an absorbent sheet, such as a paper towel with a polymer backing sheet, is secured to the punched sheet. The absorbent paper towel is secured to the smooth side of the CPET sheet. Thus, the resulting layered structure includes an apertured top layer which comprises a CPET sheet fused with a nonwoven fabric, an absorbent middle layer, and a polymer backing layer.

Food items may be cut on the fabric side of the layered sheet structure, and the holes in the top layer allow fluid to drain to the middle absorbent layer. The CPET sheet is resistant to cutting and abrasions. Also, the absorbent and the non-woven fabric can stain upon use, indicating that the sheet has been used and may be contaminated. The stains in the absorbent can be viewed through the apertures and through the substantially translucent CPET sheet. The polymer backing layer helps to prevent fluid from escaping the absorbent. When cutting is finished, the fold/tear lines formed in the top layer allow the sheet to be easily folded and disposed.

Thus, sheet materials made in accordance with preferred embodiments of the present invention have cut resistance, absorbency, stain indication capability, and foldability.

As used herein, the term "absorbent efficiency" is used to refer to a derived parameter which has been found useful to characterize sheet materials and determine whether they perform satisfactorily in the food preparation environment. The absorbent efficiency takes both absorption rate and capacity into account.

In a disposable food preparation mat, it is desirable to have a mat that absorbs a sufficient quantity of fluid in a reasonable period of time. It is also desirable for the mat to be relatively thin (most preferably 0.076 cm) to maintain good conformability to the work surface and to have an impression of disposability. An absorbent efficiency can then be defined as:

$$\text{Efficiency} = (\text{Capacity} * \text{Rate} * 10^4)/\text{thickness}$$

where capacity has units of $g_{water}/cm^2$, rate has units of $g_{water}/(s*cm^2)$, thickness has units of cm, and absorbent efficiency has units of $(g_{water}/cm^2)(g_{water}/(s*cm^2))(1/cm)$. Hence, the absorbent efficiency is maximized by maximizing the absorbent capacity and rate, and by minimizing the mat thickness.

A typical practice in preparing food is slicing fruit. As most fruits are sliced they exude aqueous juices. Especially juicy fruits—oranges for example—may exude up to 10 g of juice per fruit. It is desirable that the food preparation mat or sheet entirely absorb all 10 g of this juice within 30 seconds to facilitate clean disposal of the mat. A typical food preparation mat has an area of approximately 650 cm$^2$ and is most preferably 0.076 cm thick. Thus, it is preferred that a food preparation mat have an absorbent efficiency as defined above of at least 0.2.

As utilized herein, the term "slice resistance" (or "cut resistance") is used to refer to a derived parameter which has been found useful to characterize sheet materials and determine whether they perform satisfactorily in the food preparation environment.

Based on extensive consumer testing, a food preparation mat must have a slice resistance of at least 2.27 kgf (5 lbf), as measured using the slice resistance test discussed below, so that an average consumer will not cut through the protective surface during a single use. In addition, the thickness of the kitchen food preparation mat should be minimized to reduce waste, increase the consumers' likelihood to dispose of the sheet, and make the sheet easier to store. Therefore, the thickness of the food preparation sheet should be less than 0.254 cm (0.100 in), more preferably less than 0.127 cm (0.050 in), most preferably less than 0.076 cm (0.030 in). In order for a structure to provide a slice resistance of at least 2.27 kgf (5 lbf) at the maximum most preferably thickness of 0.076 cm(0.030 in), the structure must have a minimum unit slice resistance of 30 kgf/cm (2.27 kgf/0.076 cm=30 kgf/cm).

In addition, the top surface of the sheet material and/or the absorbent layer of the sheet material should have the capability to stain when in contact with fluids. It is preferred that the stains in the absorbent can be viewed through the apertures in the cut-resistant layer and also that the layers on top of the absorbent allow at least some light to pass through so that stains in the absorbent can be viewed. A sheet that shows stains after contact with fluid is desirable as it indicates to the user that the sheet has been used. Thus, sheet materials in accordance with this preferred embodiment of the present invention exhibit absorbency, slice resistance, the ability to stain, and foldability Test Methods The following test methods have been developed and utilized for characterizing sheet materials in accordance with the present invention.

Absorbency Rate
1) A 36 in$^2$(232.26 cm$^2$) sample is weighed and placed directly under a Buret.
2) 10 cc of distilled water is dispensed from the Buret onto the sample.
3) The water is permitted to absorb for 30 seconds.
4) At 30 seconds, the sample is tapped 10 times on its side, removing any non-absorbed water.
5) Weigh the sample and record the weight.
6) Calculate the absorbency rate as (final weight—initial weight)/time. The units are $g_{water}/s$.
7) Calculate the unit absorbency rate as ((final weight—initial weight)/time)/sample area. The units are $g_{water}/(s*cm^2)$.
8) Test 3–5 samples per above.
9) Report average of sample values.

Absorbent Capacity
1) A 16 in$^2$(103.22 cm$^2$) sample is weighed and placed into a container of distilled water, completely submerged.
2) The sample remains completely submerged for 120 seconds.
3) At 120 seconds, the sample is removed from the water and permitted to drip dry for 30 seconds.
4) At the completion of the 30 second drip dry, the sample is shaken 1 time to remove residual water.
5) Weigh the sample and record the weight.
6) Calculate the capacity as (final weight—initial weight)/sample area. The units are $g_{water}/cm^2$.
7) Test 3–5 samples per above.
8) Report average of sample values.

Absorbent Efficiency
1) Calculate the absorbent efficiency as $$\text{Efficiency}=(\text{Capacity}*\text{Rate}*10^4)/\text{thickness}$$

Slice Testing Apparatus

The test apparatus described applies a known force in the z (vertical) direction on a knife blade to measure the cut resistance of a sample. A knife blade is placed in the knife holder. The knife blades used for all testing were Poultry Blades Code #88-0337 by Personna. The test sample is mounted to a sample platform. The knife blade is then brought into contact with the sample. A known load is applied to the knife blade in the vertical direction. The sample platform is then moved at a rate of 8 inches per second for 4 inches under the weight of the knife blade creating a slice. Consecutive slices of increasing load are made until the knife blade cuts through the sample. The knife force required to penetrate completely through the sample is recorded. Slice resistance is calculated as the slice force/sample thickness. Replicate test on 3–5 separate samples and report average values.

Visible Staining
1) A solution of 200 grams of water to 0.1 gram of red food coloring is prepared. The food coloring is KROGER FOOD COLORS®# 11110 66987, and contains water, propylene glycol, and Red 40.
2) Using a syringe, one gram of the solution is deposited over approximately four square inches of the sample
3) The solution is allowed to "wet out" into the absorbent layer and inspected for color and/or stain.
4) After one minute, the surface is wiped off using a damp paper towel and again inspected for color and/or stain.
5) Steps 1–4 are repeated using blue food coloring in the solution rather than red. The food coloring is KROGER FOOD COLORS® #11110 66987, and contains water, propylene glycol, and Blue 1.
6) Steps 1–4 are repeated replacing the solution with WELCH'S® 100% Grape Juice (#41800 20750) made from water and grape juice concentrate.

Visible Staining Example

The above visible staining test was performed on a sheet material made in accordance with Example 1 described above and on a CHOP N CHOP® non-disposable cutting board # 47643 50150. The CHOP N CHOPS® cutting board was made of polypropylene with a slightly textured surface, approximately 0.022" in thickness and manufactured by New Age Products, U.S. Pat. No. 5,472,790

Even with the relatively low concentration of food coloring (0.005%), visible staining was evident in the sheet material made according to Example 1 above, both after the solution was allowed to wet out, and after the surface was wiped off. The results were similar when the grape juice was used on the sheet material, except that the staining on the sheet material was even darker.

However, when the solution was applied to the CHOP N CHOP® cutting board, there was little or no evidence of discoloration to the cutting board and no absorbance of the liquid. Also, when the CHOP N CHOP® cutting board was wiped with a damp paper towel, there was no evidence of staining of the cutting board. The results were similar when grape juice was applied, and no staining was visible on the cutting board after the grape juice was wiped off.

The foregoing descriptions of the preferred embodiments of the invention have been presented for purposes of illustration and description only. They are not intended to be exhaustive or to limit the invention to the precise forms disclosed, and modifications and variations are possible and contemplated in light of the above teachings. While a number of preferred and alternate embodiments, systems, configurations, methods, and potential applications have been described, it should be understood that many variations and alternatives could be utilized without departing from the scope of the invention.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that such modifications fall within the scope of the invention as defined by the claims appended hereto.

What is claimed is:

1. A cut-resistant and absorbent sheet, comprising:

an absorbent material, wherein said absorbent material has a thickness of between about 0.005 inches and about 0.050 inches;

a polymeric cut-resistant material attached to the absorbent material, wherein said cut-resistant material has a plurality of openings, and wherein said cut-resistant material has an open area of less than about 50 percent, and a thickness of between about 0.005 inches and about 0.020 inches;

wherein said cut-resistant material has a lower surface attached to an upper surface of said absorbent material and a substantially planar cutting surface disposed opposite said lower surface; and, wherein said cut-resistant material has between about 10 and about 200 openings per square inch.

2. The sheet as recited in claim 1, wherein the openings have a maximum dimension of between about 0.010 inches and about 0.100 inches.

3. The sheet as recited in claim 1, wherein the sheet has a plurality of fold lines formed therein.

4. The sheet as recited in claim 3, wherein the fold lines are linear and have less resistance to tearing than the remainder of the sheet.

5. The sheet as recited in claim 3, wherein the cut-resistant material has a lower surface attached to an upper surface of the absorbent material and a cutting surface disposed opposite the lower surface, and wherein the fold lines are formed on the lower surface of the cut-resistant material.

6. The sheet as recited in claim 1, wherein the cut-resistant material has a lower surface attached to an upper surface of the absorbent material and a cutting surface disposed opposite the lower surface, and wherein the sheet further comprises:

a cover layer attached to the cutting surface.

7. The sheet as recited in claim 6, wherein the cover layer comprises a fibrous material.

8. The sheet as recited in claim 1, further comprising:

a liquid impervious and skid resistant backing layer attached to the absorbent material.

9. The sheet as recited in claim 1, wherein the sheet has a raised edge along at least a portion of the periphery of the sheet.

10. The sheet as recited in claim 1, wherein the cut-resistant material has a lower surface attached to an upper surface of the absorbent material and a cutting surface disposed opposite the lower surface, wherein the cutting surface has a non-glossy appearance.

* * * * *